R. Evarts,
Fish Seine,
Nº 647.  Patented Mar. 21, 1838.
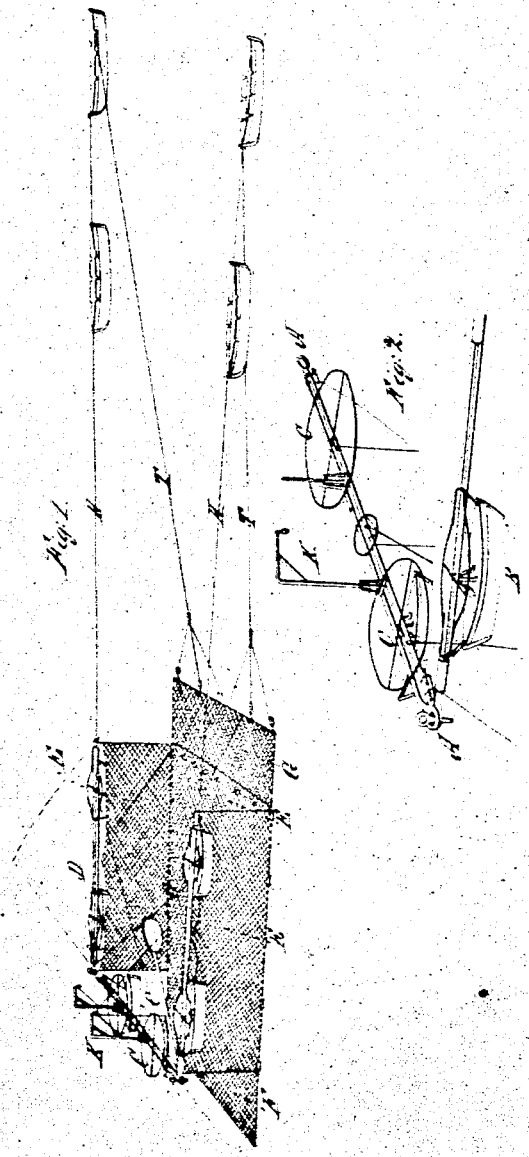
Witnesses:
Simon Baldwin
B. Baldwin
Inventor:
Russell Evarts

UNITED STATES PATENT OFFICE.

RUSSELL EVARTS, OF MADISON, CONNECTICUT.

IMPROVED FISHING-SEINE FOR DEEP WATER.

Specification forming part of Letters Patent No. 647, dated March 21, 1838.

*To all whom it may concern:*

Be it known that I, RUSSELL EVARTS, of Madison, in the county of New Haven and State of Connecticut, have invented a new and Improved Fishing Net or Seine, to be used in the open sea or in deep water independent of the shore or bottom, and the mode and manner of using it, of which the following is a specification.

The object of this invention is to form a seine which may be successfully used in taking fish which usually run in shoals and often at a great distance from shore, where ordinary nets cannot be used. This I have effected by a floating seine suspended and extended on a frame resting on float-boats, the frame forming three sides of a square open in front. The bottom and sides of the seine are formed of meshes of suitable size for the fish intended to be taken. The size of the frame and of the bottom for ordinary use may be about fifty feet square. The bottom of the seine is calculated to sink by leaden weights about five or six feet below the surface of the water, and is there suspended horizontally by the sides, turned up, and hooked to the frame.

The seine is moved by towing-boats attached to both sides, the front and rear of the seine being open until a shoal of fish is perceived. The rear is then closed and made fast to the frame. The leading tow-boat on each side then, returning to the seine, follows the fish and raises the front apron, and thereby incloses the fish, and by gathering in the seine subjects them to easy and expeditious disposition by scoops or otherwise.

To enable others skilled in the art to make and use my invention, I will more particularly describe its several parts and their use and the mode of operation, premising that the seine described is calculated for white fish, otherwise called "bony fish," or for mackerel or other fish of that size; and on the same principle, with larger and stronger meshes, it may be used for porpoises or any other fish, and the size of the frame and of the seine may vary as occasion may require.

The frame of my seine forms three sides of a square open in front. Each side is about fifty feet long, and may be made of four pieces of scantling of the length of the side. Two pieces are laid for the bottom about twelve inches apart. Short pieces of scantling are laid across, the top pieces are laid upon them, and bolted through each cross-piece. The sides of this frame are connected with the rear by iron hinges or eyes, with a bolt at the corners, as seen in the drawings, Figure 2, A A. This frame is supported on float-boats about twelve feet long, shaped like a whale-boat, with a covered deck and water-tight, the frame resting about two feet above the water, on a pivot or spindle rising, well braced, from the deck, and passing through a cross-bar of iron on the frame, strengthened by bracing-bars, the length of the boat on each side of the frame, as seen in Fig. 2, B. Two such floats support the frame on each side, and two under the rear part of the frame, as seen in Fig. 1, *b b*. The cross-bar which receives the spindle from the floats under the rear part of the frame is braced by a circular bar whose diameter is the length of the float, to which the end of the float may be made fast in the direction required, as seen in Fig. 2, *b b*. The floats under the side frames are attached to the frame at each end and there held to run in the line of the frame. The sides are set a little flaring and held in place by guy-ropes, as seen in Fig. 1, D D.

The seine is composed of meshes of twine, as usual for nets, having a bottom of net-work the size of the frame, calculated to rest or to move hoizontally for six feet (more or less) under water, supported by the sides, turned up, and fastened by hooks or otherwise to the frame, and held in place by leaden weights at their junction with the bottom, as seen in Fig. 1, E E E.

When this seine is put in motion the rear end is unhooked from the frame and is held in a horizontal position with the bottom, as seen in Fig. 1, F, by cords connected with the frame, and by which it can be drawn to its place on the frame when required. The front is left open when in motion, but may be closed by an apron, as seen in Fig. 1, *g*.

This seine is moved forward by two tow-boats in a line, attached to each side. These boats are of the size and shape of whale-boats, about twenty-five feet long. Each boat is manned with four men, with muffled oars, and moved in a line straight with the flare of the side to which they are attached, as seen in Fig. 1, H H. Lines are extended from the front apron of the seine to each of the leading towing-boats, as seen at T T. As soon as a shoal of fish is seen entering the seine a signal is given by a person standing on the rear section of the frame, and he at the same time raises the apron behind and secures it to the frame, while at the same time the leading tow-boat on each line, casting off its tow-line, turns in toward the seine, following in the fish and drawing in the line of the front apron, and by that raising the apron to its place, and thereby inclosing the fish within the seine. The seine may then be gathered in by raising the bottom in front by means of rings or loops fixed on the bottom for that purpose. These rings are to be hooked upon the sides as they are gradually drawn together in front, and there interlocked and secured, giving to the frame a triangular form. The fish inclosed may then be taken from the seine by scoops and, with the aid of a crane erected on the rear section of the frame, emptied into a scow or other receiving-vessel. (See Figs. 1 and 2, K.)

If it shall be found necessary or useful, a common net with leaden weights may be attached to each towing-line to direct the course of the shoal into the body of the seine.

This seine, with all its appendages, may be transported from the shore to the scene of operation and from one distant place to another in the following easy and expeditious manner: The seine is rolled up, beginning at the front, and as it rolls is detached from the sides and is placed upon the rear section of the frame. All the towing-boats are then attached to the front end of one of the sides and the whole move in one line to the place of operation, and when there all the parts are quickly placed in the order specified for use.

For further illustration I refer to the drawings accompanying this specification as part thereof.

I do not claim as my invention the floats or the towing-boats as above described, nor a net of twine in meshes in such form as those in common use; but What I do claim as my invention is—

1. The form of the seine substantially as specified, and the combination of the several known materials and parts necessary to its construction, as stated above.

2. The method of taking fish thereby in deep water independent of the bottom of the water or of the shore, in the manner and by the means above specified.

In testimony whereof I subscribe this instrument April 6, 1837.

RUSSELL EVARTS.

Witnesses:
SIMEON BALDWIN,
STANTON PENDLETON.